Patented Nov. 9, 1926.

1,605,974

UNITED STATES PATENT OFFICE.

JOSEPH B. OESCH, OF MILWAUKEE, WISCONSIN, ASSIGNOR TO THE NEWPORT COMPANY, OF MILWAUKEE, WISCONSIN, A CORPORATION OF DELAWARE.

TETRAKISAZO DYE AND THE PROCESS OF MANUFACTURE.

No Drawing.   Application filed September 19, 1925.  Serial No. 57,316.

This invention relates to tetrakisazo dyes capable of dyeing unmordanted cotton orange to brown shades of great fastness to light.

The new dyes are derived from aminoazo bodies of the benzene series, two molecular proportions of m-toluidine as middle components, and one molecular proportion of an end component consisting of salicylic acid and its substitution products.

These new dyes correspond to the general formula:

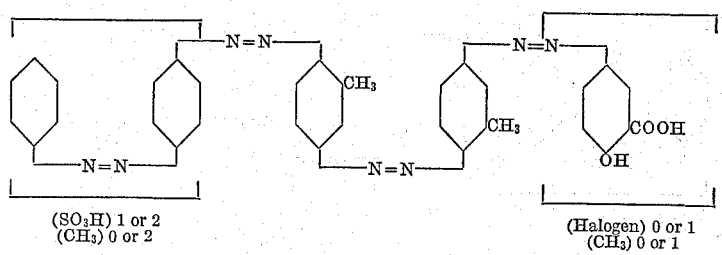

(SO$_3$H) 1 or 2
(CH$_3$) 0 or 2

(Halogen) 0 or 1
(CH$_3$) 0 or 1

The process of manufacture consists in combining an aminoazo dye of the benzene series with m-toluidine, diazotizing the intermediate disazo dye thus obtained, combining the same with m-toluidine, diazotizing the resulting trisazo dye, and combining the latter with salicylic acid or a substitution product thereof.

Without limiting our invention to any particular procedure, the following example, in which parts by weight are expressed, is given to illustrate the application of our invention in the preferred form:

Dissolve 48 parts of aminoazotoluol disulfonic acid sodium salt in 300 parts of water and diazotize at 0°–5° C. by adding 6.9 parts of sodium nitrite. This solution is then added to 40 parts of hydrochloric acid (20° Bé.). Stir and correct excess nitrate. To the diazo compound add a solution of 11.2 parts m-toluidine dissolved in 150 parts of water and 14 parts of hydrochloric acid (20° Bé.). Stir and add slowly a solution of 31 parts of sodium acetate, stirring until coupling is completed. Add 20 parts of sodium carbonate (in solution) and 7.3 parts of sodium nitrite. Run the mixture into a solution 81 parts of hydrochloric acid (20° Bé.) in 150 parts of water. Stir, correct excess nitrite, and add a solution of 11.2 parts of m-toluidine in 13.9 parts of hydrochloric acid (20° Bé.) and 150 parts of water. Stir and add slowly 16.5 parts of sodium acetate (in solution). Continue stirring until coupling is completed. Now add 38 parts of sodium carbonate and stir until complete solution is obtained. Then add 191 parts of hydrochloric acid (20° Bé.) and filter. Dilute the filter cake with about 1000 parts of water and add 4 parts of sodium hydroxide. Stir until complete solution is obtained; then add 7 parts of sodium nitrite and run the mixture into a solution of 35 parts of hydrochloric acid (20° Bé.) in 400 parts of water. Stir, correct excess nitrite, and add the diazo component to a solution of 13.8 parts of salicylic acid which has been previously dissolved in 31.8 parts of sodium carbonate and 200 parts of water. Stir and salt out, filter and dry.

The structural formula of the specific dye formed in the above example is best represented by the following:

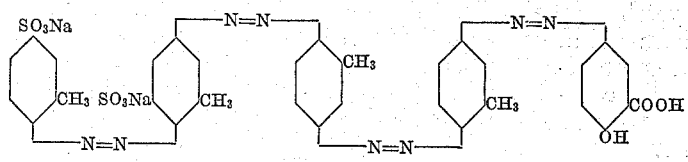

The dye thus obtained is in the shape of its sodium salt a dark powder, soluble in water to a brown solution which changes into a reddish brown by the addition of caustic soda. With hydrochloric acid the dye separates as a greenish-brown precipitate. The powder is insoluble in organic solvents such as absolute alcohol, ether, or benzene and is destroyed by strong reducing agents. It dyes cotton a yellowish brown.

The products of reduction of the specific dye formed in the above example are probably the following:—

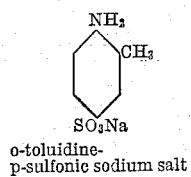
o-toluidine-
p-sulfonic sodium salt

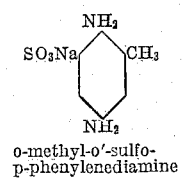
o-methyl-o'-sulfo-
p-phenylenediamine

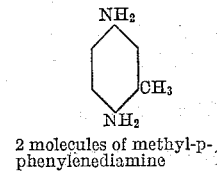
2 molecules of methyl-p-
phenylenediamine

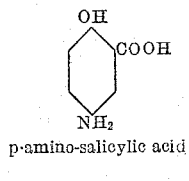
p-amino-salicylic acid

I am aware that numerous details of the process may be varied through a wide range without departing from the spirit of this invention, and I do not desire limiting the patent granted other than as necessitated by the prior art.

I claim as my invention:

1. As a new article of manufacture a tetrakisazo dye as herein described, having most probably the following formula:

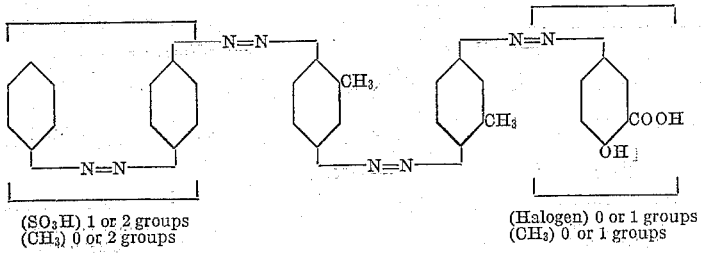

(SO₃H) 1 or 2 groups
(CH₃) 0 or 2 groups (Halogen) 0 or 1 groups
(CH₃) 0 or 1 groups this dye being in the shape of its sodium salt a dark powder, soluble in water to a brown solution, changing to a reddish-brown with sodium hydroxide; with hydrochloric acid separating out as a brown precipitate; said powder being insoluble in organic solvents such as absolute alcohol, ether, or benzene, and being destroyed by strong reducing agents; the dyeings on cotton being orange to brown.

2. As a new article of manufacture a tetrakisazo dye having most probably the general formula:

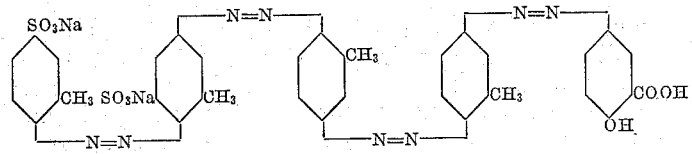

3. The method of preparing a tetrakisazo dye of the general formula:

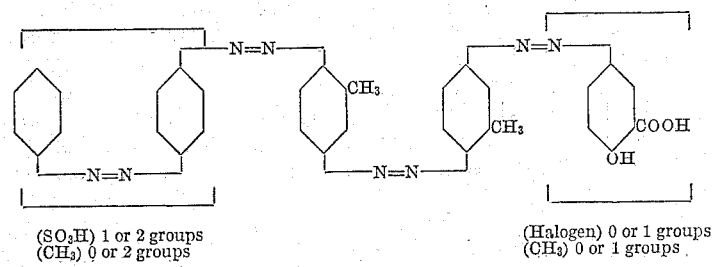

(SO₃H) 1 or 2 groups
(CH₃) 0 or 2 groups (Halogen) 0 or 1 groups
(CH₃) 0 or 1 groups which consists in combining aminoazotoluol disulfonic acid with m-toluidine, diazotizing the intermediate dye thus obtained, combining the same with m-toluidine, diazotizing the trisazo dye and combining the last mentioned compound with salicylic acid.

4. Materials dyed with the dye prepared according to claim 1.

5. Materials dyed with the dye prepared according to claim 2.

In testimony whereof I have hereunto subscribed my name.

JOSEPH B. OESCH.